United States Patent

[11] 3,596,448

| [72] | Inventor | Ernest Melville Van Buskirk<br>East Moline, Ill. |
|---|---|---|
| [21] | Appl. No. | 733,884 |
| [22] | Filed | June 3, 1968 |
| [45] | Patented | Aug. 3, 1971 |
| [73] | Assignee | International Harvester Company<br>Chicago, Ill. |

[54] CORN-HARVESTING ATTACHMENT
1 Claim, 5 Drawing Figs.

[52] U.S. Cl. .................................................. 56/63, 56/95
[51] Int. Cl. ............................................... A01d 45/02
[50] Field of Search ........................................ 56/17, 63, 95, 119, 15, 238

[56] References Cited
UNITED STATES PATENTS

| 3,508,387 | 4/1970 | Wright | 56/95 |
| 1,903,335 | 4/1933 | Falkiner | 56/17 X |
| 2,399,774 | 5/1946 | Welty | 56/95 |
| 2,401,513 | 6/1946 | Schmidt | 56/238 |
| 2,338,932 | 1/1944 | Grant | 56/238 X |
| 2,706,882 | 4/1955 | Thornton, Jr. et al. | 56/238 X |
| 2,912,811 | 11/1959 | Van Buskirk | 56/15 |
| 3,107,474 | 10/1963 | Byrd | 56/119 |
| 3,119,221 | 1/1964 | Martin | 56/119 |

FOREIGN PATENTS

| 20,849 | 2/1961 | East Germany | 56/119 |

*Primary Examiner*—Louis G. Mancene
*Assistant Examiner*—J. A. Oliff
*Attorney*—Noel G. Artman ABSTRACT: A harvester including a grain platform adapted to harvest corn comprising a plurality of ground-engaging divider points pivotally mounted and transversely spaced across the platform, for directing the stalks rearwardly toward the sickle. A vertically adjustable topping cutter is arranged to sever the stalks above the ear-bearing area and a deflector and a trash conveyor are provided for disposing of the severed stalk tops. A reel is located above the sickle and rearwardly of the topping cutter for influencing the ear bearing portion of the stalk that has been separated to fall upon the platform bed where it is collected and fed to the combine.

PATENTED AUG 3 1971

INVENTOR
ERNEST M. VAN BUSKIRK
BY
ATT'Y.

INVENTOR
ERNEST M. VAN BUSKIRK

CORN-HARVESTING ATTACHMENT

BACKGROUND OF THE INVENTION

The present invention relates generally to improvements in corn harvesters and the like and more particularly to new and improved corn harvesters that sever the stalk above and below its ear-bearing area and gather the ear-bearing portion of the stalk into the harvesting machine.

In the conventional platform for harvesting grain such as wheat the plant is severed near its base and the entire severed plant is fed into the combine. The entire severed plant is then subjected to the threshing and separating action of the combine, the clean grain is collected in the grain tank and the trash such as the stems and leaves are discharged from the combine. A process such as this is not practical for the harvesting of corn because of the great quantity and bulk of the corn stalk leaves and husks. Thus, the conventional process used in the harvesting of corn has been to remove the ear corn from the stalk, collect the ears and feed the collected ears to the harvesting machine leaving the stalk and leaves in the field. To accomplish this, corn has been traditionally planted in rows and an individual picking or snapping unit is provided on the harvesting machine for each row to be harvested. For various reasons there has been a trend to reduce the spacing between the rows and there is now a considerable amount of corn planted in rows as narrow as 20 inches. Since it does not appear feasible under the present technology to further reduce the width of the picking unit, it appears that the trend in reducing the row width has reached a limit in the 20 inch area. Thus if more corn is to be planted per acre a different process must be used to harvest the corn. If the individual picking units can be eliminated then it will be possible to reduce the spacing between rows below the 20 inch limit and possibly to eliminate rows completely and broadcast plant the corn in a random fashion.

SUMMARY

The general purpose of this invention is to provide a corn harvester through the modification of a grain platform which embraces all the advantages of corn harvesters and possesses none of the aforedescribed disadvantages. To attain this the present invention contemplates mounting a plurality of ground-engaging divider points spaced across the width of the platform for urging the stalks rearwardly toward the sickle that will sever them at their base. A topping cutter is arranged to sever the stalk tops above the ear-bearing area and means are provided to dispose of the severed tops. The ear-bearing portion of the stalk is then collected and fed to the harvesting machine where it is processed through the threshing, separating and cleaning apparatus and the clean grain is deposited in the grain storage tank. In this arrangement a portion of the stalk below the ear-bearing area and a portion of the stalk above the ear-bearing area are not fed to the harvesting machine and thus a considerable amount of the bulky trash is eliminated. By eliminating this material a conventional combine has the capacity to separate the grain from the remaining trash material. In this arrangement the large picking units have been eliminated and it is thus possible to plant the corn in much narrower rows or to harvest broadcast planted corn.

It is an object of the present invention to modify a combine grain platform such that it harvest the ear-bearing portion of the corn stalk to thus permit the harvesting of narrow row corn and the harvesting of broadcast planted corn.

DESCRIPTION OF THE PREFERRED EMBODIMENTS

Figure 1:
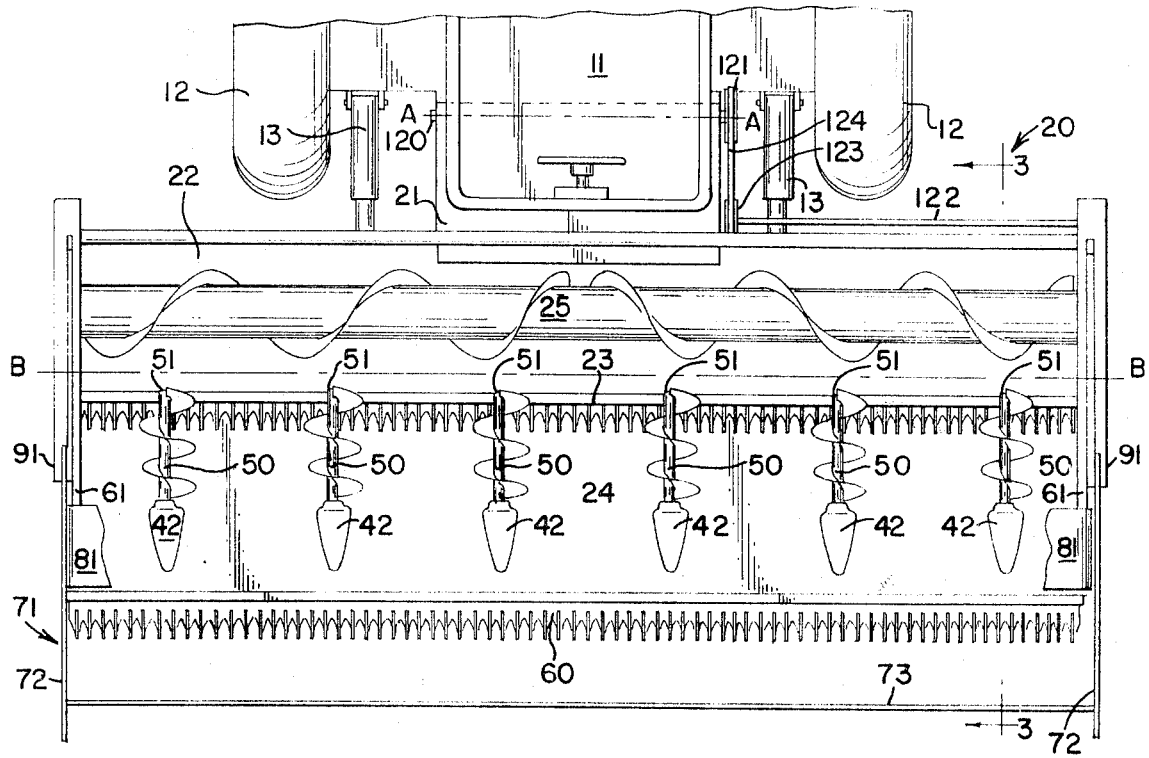
FIG. 1 is a plan view of a portion of a combine having a grain platform mounted thereon adapted for the harvesting of corn.

Referring now to the drawings wherein like reference characters designate like or corresponding parts throughout the several views there is shown in FIG. 1 a combine designated 10 having an operator's platform 11 and a drive wheel 12. A platform designated 20 is pivotally mounted upon the combine about the horizontal axis A–A. A pair of hydraulic lift cylinders designated 13 are connected at one end to the combine and at the other end to the platform 20 and function in a conventional manner to raise and lower the platform about the pivot axis A–A.

Figure 2:
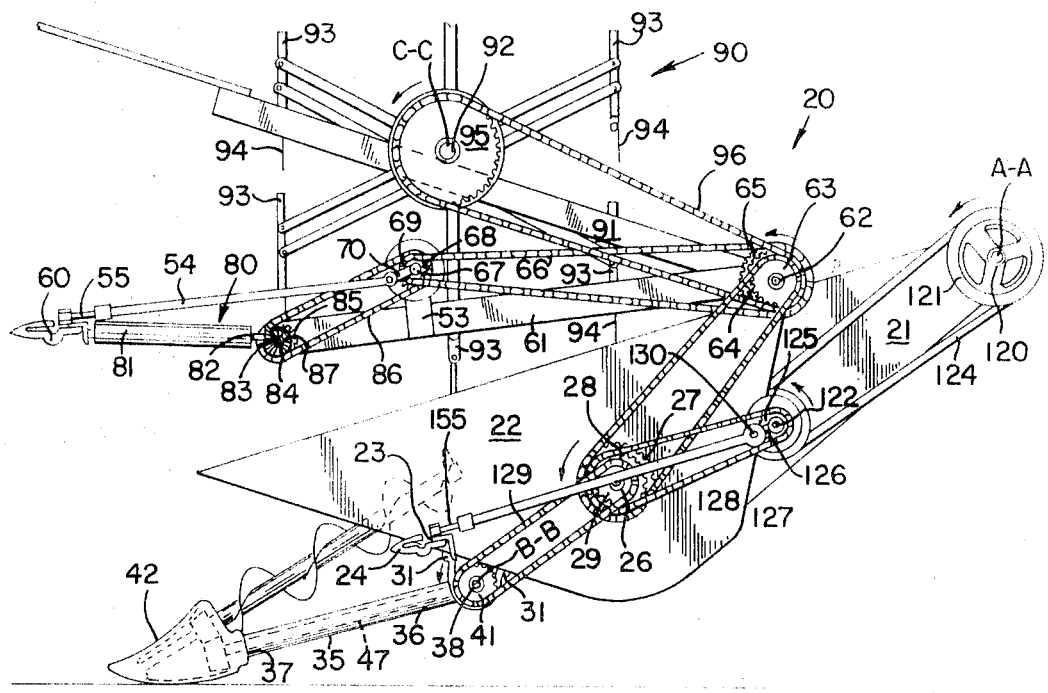
FIG. 2 is a side view of the corn-harvesting platform showing the drives for the various platform elements.

The basic platform 20 is a conventional grain-harvesting platform having a feeder section 21 and a transverse material table 22. The transverse material table 22 terminates in a forward transverse leading edge 23 along which there is mounted a sickle 24. A transverse conveyor means 25 in the form of an auger having oppositely rotating flights is supported on the platform 20 such that it overlies the material table 22. The conveyor means 25 is carried on a shaft 26 which when driven causes rotation of conveyor means 25. Upon rotation of the conveyor means 25 material is conveyed centrally and then fed rearwardly into the feeder section 21. The feeder section 21 houses a conveyor (not shown) that feeds the material rearwardly depositing it to the combine where it is processed by the threshing, separating and cleaning units of the combine. As can be seen in FIG. 2, shaft 26 has mounted thereon a first sprocket 27, a second sprocket 28 and a third sprocket 29. As shall be described further these sprockets constitute a portion of the drive means for the transverse conveyor 25 and other elements of the platform 20. The platform 20 as thus far described is a conventional grain harvesting platform for use with the combine.

Figure 3:
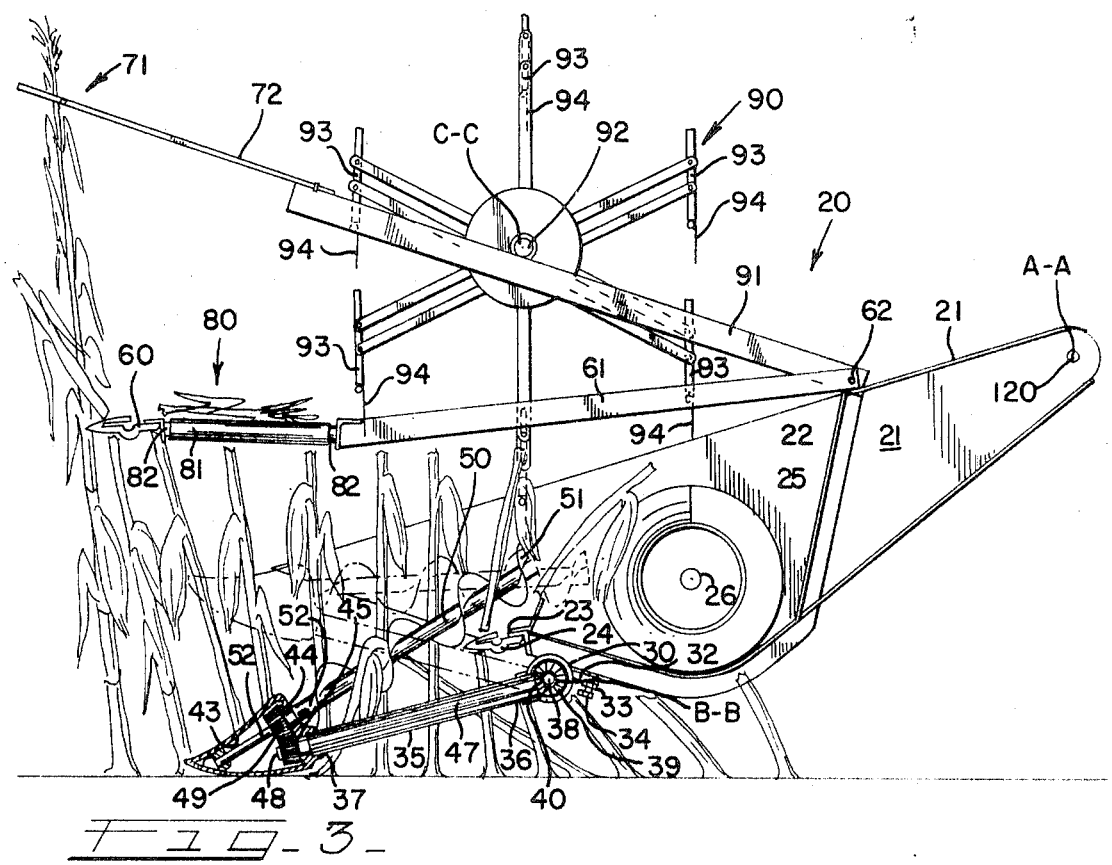
FIG. 3 is a cross-sectional side view of the corn-harvesting platform taken through lines 3–3 of FIG. 1.

An elongated transverse tube 30 having a transverse axis designated B–B is mounted for rotation along the bottom surface of the transverse material table 22. Journal means 31 are shown in FIG. 2 for rotatably mounting the transverse tube 30 on the bottom surface of the material table 22. As seen in FIG. 3 tabs 32 carrying nuts 33 are rigidly secured to the transverse tube 30 and extend rearwardly therefrom. Bolts 34 are threaded into the nuts 33 and extend through the tabs 32. The free end of the bolt thus functions as adjustable stops that are adapted to engage the bottom surface of the transverse material table 22. As can be best visualized in FIG. 3 the adjustable stop formed by the bolt 34 will limit the counterclockwise rotation of the transverse tube 33. Thus if the platform 20 were to be elevated from the position shown in FIG. 3, the transverse tube could rotate in a counterclockwise direction relative to the platform 20 until the bolt 34 engages the bottom surface of the material table 22. Upon further elevation of the platform 20 there would be no relative movement between the transverse tube 30 and the platform 20.

A plurality of tubular elongated members 35 are connected at one end 36 to the transverse tube 30 and terminate in free ends 37 at a point forward of the transverse tube 30.

A ground-engaging shoe designated 42 is connected to each of the free ends 37. The ground-engaging shoes have a forward point and diverge rearwardly therefrom such that they function to open a path through the crop to be harvested. The ground-engaging shoes 42 are hollowed out to form gearbox cavities designated 43. There are two openings into the gearbox cavity 43 which openings carry bearings 44 and 45 for a purpose to be discussed.

There is a shaft 38 journaled within the transverse tube 30 carrying a plurality of beveled gears 39. The end portion of shaft 38 carries a sprocket 41 through which rotary motion is supplied to the shaft 38.

The means for driving the auger divider points include shafts 47 journaled at one end in the bearing 45 carried by the ground-engaging shoes. Shafts 47 have end portions 48 that extend within the gearbox cavity 43. A bevel gear 40 is carried by the rear end of each shaft 47 such that it meshes with a beveled gear 39 carried by shaft 38. Auger divider points 50 are journaled at end 52 in bearings 44 and include end portions 52 that extend into gear cavity 43. The auger divider points extend upwardly and rearwardly terminating in free ends 51 that overlie the sickle 24. A pair of intermeshing bevel gears 49 are secured to the end portions 48 and 52 within the gearbox cavity 43. Thus when sprocket 41 carried by shaft 38 is rotated a rotary motion is transmitted through beveled gears 39 and 40 to the shafts 47 which in turn transmit the rotary motion through the intermeshing bevel gears 49 to the auger divider points 50.

An elongated topping knife 60 is supported by the platform 20 at a location above and forward of the sickle 24. As can be seen in FIG. 1 the elongated topping knife 60 extends the entire width of the platform 20. The topping knife 60 is supported at each edge of the platform 20 by an arm 61 which is pivotally mounted at its rear end on pivot shaft 62. A first sprocket 63, second sprocket 64 and third sprocket 65 are also journaled on the pivot shaft 62. As shall be discussed further sprockets 63, 64 and 65 function to supply the drive to the topping knife 60 and other components of the platform. As can be best seen in FIG. 2 there is a mount 53 carried by the arm 61 that rotatably supports a stub shaft 67. Crank 70 and sprockets 68 and 69 are fixed to the stub shaft 67 and rotate therewith. A pitman arm 54 is pivotally supported at one end to the free end of the crank 70 and its other end to the topping knife drive 55.

A trash conveyor 80 is supported by the platform immediately behind and at the level of elongated topping knife 60. The purpose of the conveyor is to convey to the side and dispose of any tops that fall rearwardly after being cut by the topping knife 60. The conveyor as illustrated is of the draper type including a continuous band of canvas 81 having rollers 82 at each end. The drive for the left-hand roller 82 is shown in FIG. 2 and includes a bevel gear 83 secured to the roller. A stub shaft 84 is journaled on the arm 61 and has secured thereto a sprocket 85 and a bevel gear 87 that meshes with bevel gear 83. Sprocket 85 is connected by chain 86 to sprocket 69 and is driven thereby.

Figure 5:
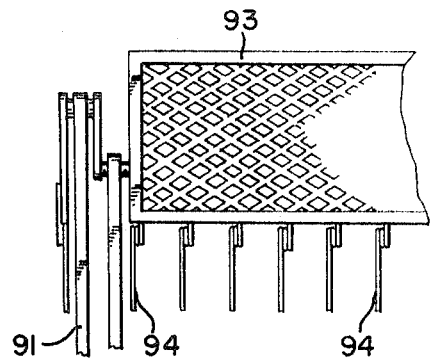
FIG. 5 is an enlarged view of the reel bat.

A second pair of arms 91 are pivotally mounted on the pivot shaft 62 so they can be raised, lowered and locked in a desired position. The arms 91 extend upwardly and forwardly and form the support for the reel 90. The reel 90 has a center shaft 92 adapted to be rotated about the axis of rotation C–C which overlies the sickle 24. The reel 90 includes bats 93 made of a transparent screen material such as expanded metal, wire mesh or clear plastic (see FIG. 5) so as not to obstruct the operator's view of the harvesting operation below the reel. A plurality of tines 94 extend downwardly from the bottom edge of the bats 93 and can be eliminated or shortened if necessary to permit the reel to operate closer to the free ends 51 of the auger divider points 50. As can be best seen in FIG. 5 the height of the bats 93 is larger than the conventional and the tines 94 extend this dimension even further. These oversized bats serve to contain ears of corn on the material table 22 as they are being thrown about by transverse conveyor 25. As can be seen in FIG. 2 the shaft 92 of the reel carries a sprocket 95 which is connected by a chain 96 to the sprocket 65. The reel 90 illustrated in this application is of a conventional type in which the bats 93 are always maintained at a vertical attitude. Since this is a conventional reel the details for maintaining the bats in the vertical attitude will not be disclosed herein. Reference may be made to the U.S. Pat. to Hume et al. No. 2,102,709 of Dec. 21, 1937 for a complete disclosure of a reel of this type.

As is best seen in FIGS. 1 and 3 a stalk depressor means 71 is provided to urge the severed stalk tops to fall forwardly in the direction of travel of the harvesting machine. The stalk depressor means 71 includes a pair of arms 72 secured to the arms 91 and extending forwardly therefrom and a cross bar or pivot shaft 73 that connects and extends across the free ends of arms 72.

Figure 4:
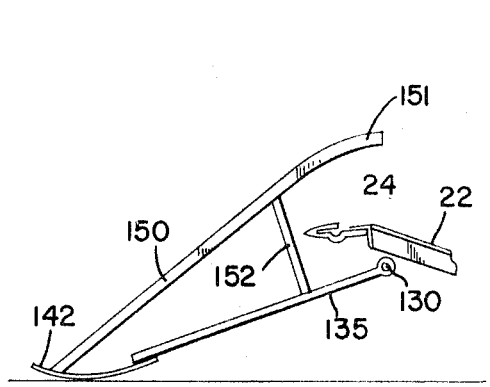
FIG. 4 shows another embodiment of the ground-engaging divider point.

Referring now to FIG. 4 wherein there is illustrated another embodiment of the divider member. In this embodiment there is a transverse rockshaft 130 carried by the transverse material table 22 at a point below the sickle 24. There are a plurality of elongated members 135 pivotally mounted upon the transverse rockshaft 130 and spaced across the material table 22 in a selected pattern. At the free end of the elongated members 135 there is a ground-engaging shoe 142 having a divider point 150 secured thereto and extending rearwardly and upwardly therefrom. The divider point 150 terminates in free ends 151 at a point above the sickle 24. As shown in FIG. 4 there is a brace 152 extending from the divider point and the elongated member 135 which functions merely as a support.

In preparing a conventional grain platform for the harvest of corn the transverse tube 30 is mounted on the lower surface of the material table 22 and an appropriate number of tubular elongated members 35 are mounted on the tube 30. If the corn to be harvested is planted in rows, a member 35 is positioned on the tube 30 such that there is a member 35 midway between each row of corn. If the corn to be harvested has been broadcast planted then the spacing between the elongated members and the total number of elongated members required will be determined by the type of corn and its condition when harvested. The topping knife 60, trash conveyor 80, reel 90 and the stalk depressor 71 and their respective drive means are all assembled on the platform 20. After the assembly has been completed the height above the ground level of platform 20 and thus the sickle 24 is adjusted by actuation of the hydraulic lift cylinders 13. It is the object to adjust the platform 20 such that the sickle 24 will sever the stalk at a point below which there are no ears of corn. Thus the base of the stalk and its root is left in the field. The location of the topping knife 60 is then adjusted by pivoting the arms 61 and locking them in an adjusted position. The topping knife 61 is adjusted so that it will sever the tops of the stalks at a point at which there will be no ears of corn remaining on the severed tops. The position of the reel 90 is adjusted through the arms 91 such that the bats 93 will engage the stalk after the tops have been severed but before the base has been severed. The vertically arranged bats 93 will exert a rearward pressure on the standing stalk in cooperation with the force exerted by the auger divider point 50 causing the severed stalk to fall upon the transverse material table 22 after being severed at its base by the sickle 24. The severed midportion of the stalk having the ears of corn connected thereto is moved centrally of the material table 22 through the action of the transverse conveyor means 25 and is then fed rearwardly through the feeder 21 and into the body of the combine 10 where it is processed by the threshing, separating and cleaning mechanisms of the combine.

The drive for the various elements of this corn harvesting device is taken from the drive shaft 120 that is mounted for rotation about axis A–A. Drive shaft 120 carries a pulley 121 that is connected by a belt 124 to a second pulley 123 carried by a driven shaft 122. The driven shaft 122 extends transversely along the left side of the material table 22 terminating adjacent the left edge of the material table. A sprocket 125 and crank 126 are carried by the driven shaft 122 adjacent the left edge of the material table 22. The crank 126 is connected by a pitman arm 127 to the drive means 155 of the sickle 24. The rotary motion of driven shaft 122 is transmitted to shaft 26 through the sprocket 125, chain 128 and second sprocket 28. The rotary motion thus transmitted to shaft 26 is further transmitted to shaft 38 through the third sprocket 29, chain 129 and sprocket 41. The rotary motion of shaft 26 is also transmitted to the pivot shaft 62 through the first sprocket 27 carried by shaft 26, chain 130 and the first sprocket 63 carried by the pivot shaft 62. For the drive means previously described rotary motion from the pivot shaft 62 is transmitted through chain 96 to drive the reel 90 and through chain 66 to drive the stub shaft 67 from which the drive for the trash conveyor 80 and the topping knife 60 are taken.

It should be understood of course that the foregoing disclosure relates to only a preferred embodiment of the invention and that numerous modifications or alterations may be made therein without departing from the spirit and the scope of the invention as set forth in the appended claims.

What I claim is:

1. A combine having a platform mounted thereon about a generally horizontal axis, said platform extending forwardly from the combine in the direction of travel;

said platform including a transverse material table having a leading edge, a sickle mounted along the leading edge, transverse conveying means supported by said platform and overlying said material table for collecting crop material deposited on the material table;

a plurality of elongated members pivotally supported at one end on said material table below said sickle about a generally transverse axis;

ground-engaging shoes connected to the free end of said elongated members, divider points connected to said ground-engaging shoes and extending rearwardly therefrom, said divider points terminating in free ends that overlie said sickle;

an elongated topping knife, supported by said platform above and forward of said sickle, spanning said material table;

a trash conveyor supported by said platform immediately behind and at the same elevation as said elongated topping knife, said trash conveyor being adopted to collect material, convey it in a transverse direction and deposit it along the cut crop side of the platform; and stalk depressor means, supported by said platform above said topping knife, for guiding the cut tops to fall forwardly.